(12) United States Patent  
Guan

(10) Patent No.: US 12,026,146 B2  
(45) Date of Patent: Jul. 2, 2024

(54) DATA ANALYSIS METHOD, APPARATUS AND DEVICE

(71) Applicant: BOE Technology Group Co., Ltd., Beijing (CN)

(72) Inventor: Rui Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 49 days.

(21) Appl. No.: 17/908,423

(22) PCT Filed: Oct. 22, 2021

(86) PCT No.: PCT/CN2021/125812  
§ 371 (c)(1),  
(2) Date: Aug. 31, 2022

(87) PCT Pub. No.: WO2022/105540  
PCT Pub. Date: May 27, 2022

(65) Prior Publication Data  
US 2023/0087098 A1 Mar. 23, 2023

(30) Foreign Application Priority Data  
Nov. 20, 2020 (CN) .......................... 202011309541.4

(51) Int. Cl.  
*G06F 16/23* (2019.01)  
*G06F 16/9536* (2019.01)

(52) U.S. Cl.  
CPC ...... *G06F 16/2358* (2019.01); *G06F 16/9536* (2019.01)

(58) Field of Classification Search  
CPC .. G06F 16/2358; G06F 16/9536; G06F 16/93; G06F 16/9535; G06F 16/958; G06Q 10/06; G06Q 10/10  
See application file for complete search history.

(56) References Cited

U.S. PATENT DOCUMENTS 10,024,714 B1 * 7/2018 Gao .......................... G01J 1/42

FOREIGN PATENT DOCUMENTS

| CN | 110020166 A | 7/2019 |
|---|---|---|
| CN | 110222032 A | 9/2019 |

(Continued)

OTHER PUBLICATIONS

PCT/CN2021/125812 international search report and written opinion.

*Primary Examiner* — Albert M Phillips, III  
(74) *Attorney, Agent, or Firm* — IPro, PLLC

(57) ABSTRACT

Provided are a data analysis method, a data analysis apparatus and a device. The method includes: obtaining historical event information recording a target event, the historical event information including a user related to the target event and state information of the recorded target event; obtaining a user information table and an event recording table according to the historical event information; after reading collected data, which were recorded according to users' performance of the target event, determining a second target user corresponding to the target event of which the state information is the target state in the collected data, and not recorded in the user information table; and adding the second target user to the user information table, and writing the target event of the second target user into the event recording table according to the collected data.

13 Claims, 4 Drawing Sheets

(56) References Cited

FOREIGN PATENT DOCUMENTS

| CN | 110489412 | A | 11/2019 |
|---|---|---|---|
| CN | 111953763 | A | 11/2020 |
| CN | 112417281 | A | 2/2021 |

* cited by examiner

DATA ANALYSIS METHOD, APPARATUS AND DEVICE

CROSS-REFERENCE TO RELATED APPLICATIONS

The present disclosure is the U.S. national phase of PCT Application No. PCT/CN2021/125812 filed on Oct. 22, 2021, which claims priority to the Chinese Patent Application No. 202011309541.4 filed on Nov. 20, 2020, the disclosures of which are hereby incorporated by reference in their entireties.

TECHNICAL FIELD

The present disclosure relates to the field of data processing technology, and more particularly to a data analysis method, a data analysis apparatus and a device.

BACKGROUND

Batch analysis and processing of network data is an indispensable technique for various application scenarios. For example, as for the iGallery application (App), an event to be analyzed mainly refers to uploading, by a user, a published work. A content producer refers to an uploader of a published work that is "Reviewed, in the Normal state" within a certain statistical period, and content producers are further categorized into professional generated content producer (PGCP), such as an art institution or an artist, and user generated content producer (UGCP).

The work may experience state change, for example, its state may change from "Reviewed, in the Normal state" to "Fail the review" or "Under review". Therefore, a content producer may be disqualified. In addition, the state of a user may also change, for example, it may be upgraded from ordinary user to artist, or may be reverted from art institution to ordinary user, and the like; that is, the producer may also experience a state change from PGCP to UGCP or from UGCP to PGCP. The changeability increases the difficulty of statistical analysis.

With a common database management system, it is usually unable to meet the requirement that content attributes change as the state changes, so it is unable to provide accurate data analysis results in case that content attributes undergo multiple changes.

SUMMARY

In an embodiment of the present disclosure, a data analysis method is provided, including:
  obtaining historical event information recording a target event; the historical event information including a user related to the target event and state information of the recorded target event;
  obtaining a user information table and an event recording table according to the historical event information, wherein the user information table is used for recording a first target user, the state information corresponding to the first target user being a target state, and the event recording table is used for recording a target event of the first target user;
  after reading collected data, which were recorded according to users' performance of the target event, determining a second target user corresponding to the target event of which the state information is the target state in the collected data, and not recorded in the user information table; and
  adding the second target user to the user information table, and writing the target event of the second target user into the event recording table according to the collected data.

Optionally, in the data analysis method, the obtaining a user information table according to the historical event information includes:
  selecting, from the historical event information, a target event of which the state information is a target state; and
  recording a user identifier of a first target user corresponding to the selected target event in a user identifier field, to obtain the user information table recording the first target user.

Optionally, the data analysis method further includes:
  obtaining an attribute of the first target user according to an attribute table associated with the first target user; and
  recording the attribute of the first target user as an attribute field written into the user information table.

Optionally, in the data analysis method, the attribute includes a user type and an event product type;
  wherein obtaining an attribute of the first target user according to an attribute table associated with the first target user includes:
  obtaining the user type of the first target user according to the attribute table;
  determining the event product type according to the user type; and
  generating the attribute field according to the event product type.

Optionally, in the data analysis method, obtaining an event recording table according to the historical event information includes:
  associating a user identifier of the first target user with a target event in the historical event information to obtain the target event corresponding to the first target user; and
  recording the target event corresponding to the first target user, to obtain the event recording table.

Optionally, in the data analysis method, determining a second target user corresponding to the target event of which the state information is the target state in the collected data, and not recorded in the user information table includes:
  selecting, from the collected data, a target event of which the state information is the target state; and
  associating a user corresponding to the target event of which the state information is the target state with the user information table, and determining the user corresponding to the target event of which the state information is the target state as the second target user in case that there is no associated user in the user information table.

Optionally, in the data analysis method, in case that the user information table has a user identifier field and a user type field, the associating the user corresponding to the target event of which state information is the target state with the user information table includes:
  associating a user identifier field and a user type field of the user corresponding to the target event of which state information is the target state with the user information table, and in case that there is no user associated with the user identifier field and the user type field in the user information table, determining the user corresponding to the target event of which state information is the target state as the second target user.

Optionally, the data analysis method further includes:
when the target event of the second target user is written into the event recording table, adding a first-time record field, the first-time record field being recorded in the event recording table in association with the second target user.

Optionally, the data analysis method further includes:
obtaining a query information for performing a target-condition-based query in the event recording table; and
looking for, according to the query information, a third target user in the event recording table, the latest recorded state information of the third target user satisfying the target condition.

In an embodiment of the present disclosure, a data analysis apparatus is provided, including:
a first information obtaining module for obtaining historical event information recording a target event; the historical event information including a user related to the target event and state information of the recorded target event;
a second information obtaining module for obtaining a user information table and an event recording table according to the historical event information; wherein the user information table is used for recording a first target user, the state information corresponding to the first target user being a target state, and the event recording table is used for recording a target event of the first target user;
a first processing module for, after collected data, which were recorded according to users' performance of the target event, is read, determining a second target user corresponding to the target event of which the state information is the target state in the collected data, and not recorded in the user information table; and
a second processing module for adding the second target user to the user information table, and writing the target event of the second target user into the event recording table according to the collected data.

In an embodiment of the present disclosure, a processing device is provided, including: a processor, a memory, and a program stored in the memory and executable by the processor, wherein the processor is configured to execute the program to implement the data analysis method as described in any one of the above items.

In an embodiment of the present disclosure, a readable storage medium storing thereon a program is provided, wherein the program is configured to be executed by a processor to implement the steps of the data analysis method as described in any one of the above items.

BRIEF DESCRIPTION OF THE DRAWINGS

In order to more clearly illustrate the technical solutions of the embodiments of the present disclosure and in the related art, a brief description will be given below with reference to the accompanying drawings which are to be used in the description of the embodiments. It is obvious that the drawings in the following description are only some embodiments of the present disclosure, and it would have been obvious for a person of ordinary skill in the art to obtain other drawings according to these drawings without involving any inventive effort.

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

Figure 1:
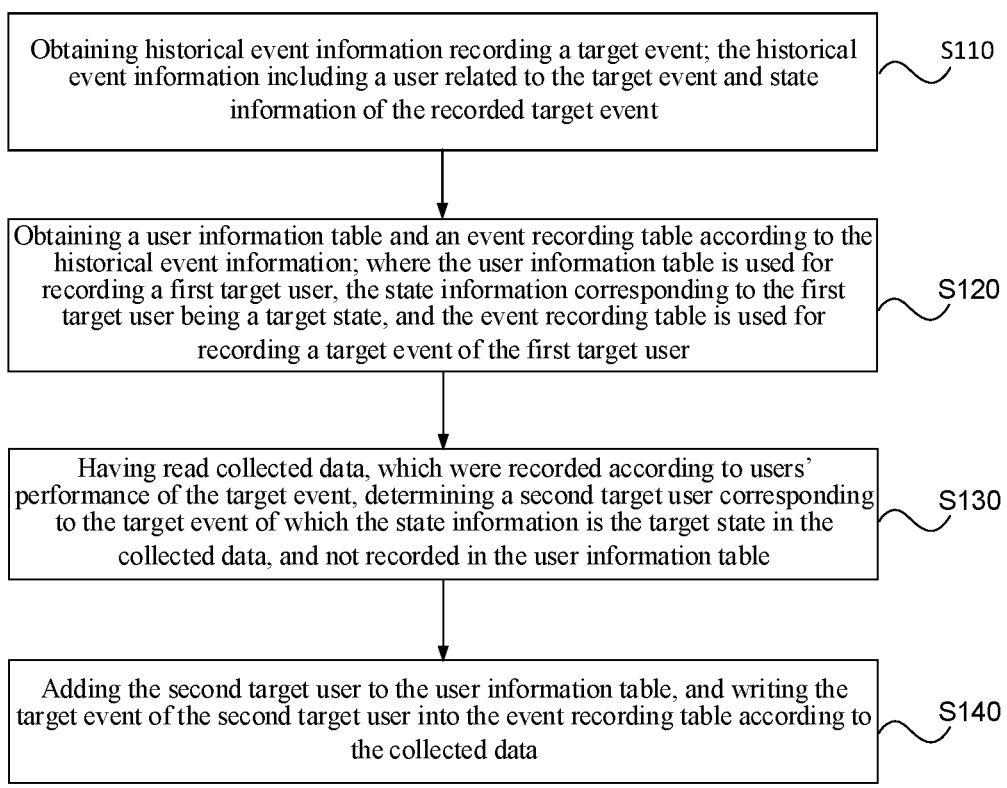
FIG. 1 shows a flowchart illustrating a data analysis method in accordance with an embodiment of the present disclosure.

To solve the problem that the existing data analysis methods cannot provide accurate data analysis results for data with active changes in content attributes, an embodiment of the present disclosure provides a data analysis method, as shown in FIG. 1, the method includes:
at S110, obtaining historical event information recording a target event; the historical event information including a user related to the target event and state information of the recorded target event;
at S120, obtaining a user information table and an event recording table according to the historical event information; where the user information table is used for recording a first target user, the state information corresponding to the first target user being a target state, and the event recording table is used for recording a target event of the first target user;
at S130, after reading collected data, which were recorded according to users' performance of the target event, determining a second target user that corresponds to the target event of which the state information is the target state in the collected data, and is not recorded in the user information table; and
at S140, adding the second target user to the user information table, and writing the target event of the second target user into the event recording table according to the collected data.

According to the data analysis method, historical data of a target event is associated with a user to obtain historical event information, and the historical event information includes the user related to the target event and state information of the recorded target event, i.e., the historical event information is also an initialization content event table; and a first target user corresponding to the target event of which the state information is a target state is extracted, in terms of users, based on the historical event information, into a producer table generated from the initialization target events, i.e., generating a user information table; and a target event corresponding to the first target user is extracted to generate an event recording table for recording the target event corresponding to the first target user. On this basis, after the collected data of the target event is read, the collected data may be batch processed to screen out a second target user whose corresponding target event is triggered into the target state for the first time, and the second target user is added into the user information table while its target event is added into the event recording table.

According to the above embodiment, the user information table and the event recording table are generated and initialized based on the historical data information, and after subsequent batch processing of the collected data related to the target event, a user corresponding the target event of which the state information is the target state is screened from the collected data, and the user information table and the event recording table can be maintained according to the screened user and the target event corresponding to the user. The method is applicable to data analysis scenarios in which the state information about a corresponding target event changes actively, and the state information of the corresponding user about the target event changes frequently. According to the maintained user information table and event recording table, the user corresponding to the target event of which the state information becomes the target state for the first time can be accurately analyzed.

In an embodiment of the present disclosure, optionally, the data analysis method is applicable to review state statistical analysis of the uploaded published works, and can identify a user whose uploaded work undergoing review state conversion into "Reviewed, in the Normal state" for the first time, and obtain the work uploaded by the corresponding user.

It should be noted that, among users uploading published works, an uploader of a published work that is "Reviewed, in the Normal state" within a statistical period is generally referred to as a content producer. Content producers are further categorized into professional generated content producers (PGCP), such as an art institution or an artist, and user generated content producers (UGCP).

The state of the uploaded work may change, for example, change from "Reviewed, in the Normal state" to "Fail the review" or "Under review", so content producers may become non-producers. Therefore, the state attribute of a user may also change, for example, upgrade from an ordinary user to an artist, or convert from an art institution to an ordinary user, etc. That is, the producer may also change from PGCP to UGCP or from UGCP to PGCP.

For example, when the data analysis method is applied to the above scenario, in an embodiment of the present disclosure, optionally, the target event may be a work uploading event, where in an implementation, the state information of the target event may be a state after the uploading, and the target state is a state of "Reviewed, in the Normal state"; optionally, in another implementation, the state information of the target event may also include a user state attribute of the user corresponding to the uploaded work.

In view of the above-mentioned complexity that the attribute of a producer will change as the state information of the event changes, the present disclosure provides the data analysis method which can accurately calculate relevant indexes, for example, accumulated, newly added and active content producers, that is to say, can accurately identify users corresponding to the target event of which the state information is the target event.

Specifically, by maintaining the user information table and the corresponding event recording table corresponding to the target event of which the state information is converted into the target state, a subsequent query can determine the latest piece of data of a corresponding user within a preset time period as an attribute of the user for index calculation.

The data analysis method provided by the embodiment of the present disclosure may, optionally, be applied to a columnar database management system for data analysis processing, for example, Clickhouse. The database management system is suitable for scenarios which requires more reading than writing, a large number of rows and a small number of columns, batch writing of data, no updates, etc. However, the Clickhouse database management system suffers from following disadvantages: transaction operation is not supported, and upgrade operation is not supported; performance degrades when large amounts of data are added. With the data analysis method described in the embodiments of the present disclosure, the advantages of the Clickhouse database management system in terms of query speed can be ensured, and the above-mentioned defects can be avoided; and a data analysis method which can perform accurate analysis on relevant indexes such as accumulation, new addition and active content producers is provided, so as to achieve the effect of providing accurate data analysis even if the attributes of the generated content producers have changed many times.

Specific implementations of the data analysis method described in embodiments of the present disclosure are described in detail below by using the Clickhouse database management system as an example for data analysis applied to published works uploaded by users.

Optionally, at step S110, the obtained historical event information of the target event may be a table of works uploaded by a plurality of users, where the works table includes published works uploaded by the plurality of users respectively and the states of the uploaded works.

At step S120, the obtaining a user information table according to the historical event information includes:
  selecting a target event of which the state information is a target state from the historical event information; and
  recording a user identifier of a first target user corresponding to the selected target event in a user identifier field, to obtain a user information table recording the first target user.

Optionally, the state information is the state of the published work after uploading, and the target state is "Reviewed, in the Normal state", that is to say, all the published works in the state of "Reviewed, in the Normal state" are screened out from the historical event information, for example, the works table.

That is, the user information table records the first target user who has uploaded the selected published work of which the state is "Reviewed, in the Normal state".

Optionally, the method further includes:
  obtaining an attribute of the first target user according to an attribute table associated with the first target user; and
  recording the attribute of the first target user as an attribute field written into the user information table.

Optionally, the attribute includes a user type and an event product type;
  where the obtaining an attribute of the first target user according to an attribute table associated with the first target user includes:
  obtaining the user type of the first target user according to the attribute table;
  determining the event product type according to the user type; and
  generating the attribute field according to the event product type.

When the target event is that a user uploads a published work, the user type may be denoted as user_type, for example, which may include an art institution, an artist, or an ordinary user;
  the event product type may be denoted as productor_type, which is used to distinguish among a professional generated content producer (PGCP), a user generated content producer (UGCP), or an ordinary user.

Specifically, the obtaining an attribute of the first target user according to an attribute table associated with the first target user specifically includes:

associating a user attribute (user type) with a user id in the works table to obtain the user_type; and determining whether the user is a PGCP, a UGCP or an ordinary user according to the content of the user_type, to generate an identification field producer_type (namely, a field for identifying an event product type).

According to the description above, the recording the attribute of the first target user as an attribute field written into the user information table includes:

inserting the generated field information of the event product type into the user information table, to complete the initialization of the user information table.

Taking the example of recording the generated user information table as producer_info, specifically, the generated identification field producer_type is inserted into a corresponding producer_info table in the Clickhouse, and the initialization of the content producer table is completed.

In an embodiment of the present disclosure, optionally, the obtaining an event recording table according to the historical event information includes:

associating a user identifier of the first target user with a target event in the historical event information to obtain the target event corresponding to the first target user; and recording the target event corresponding to the first target user, to obtain the event recording table.

Optionally, the event recording table may be recorded as a product_event table, and the user identifier of the first target user in the user information table is associated with the target event in the historical event information; optionally, if an attribute field is recorded in the user information table, when the user identifier is associated with the historical event information, the historical event information may be associated with the attribute field in the user information table according to the user identifier, to obtain a corresponding target event, that is to say, a full historical works table of uploaded works is inserted into a corresponding product_event table in the Clickhouse, to obtain an initialized event recording table.

Figure 2:
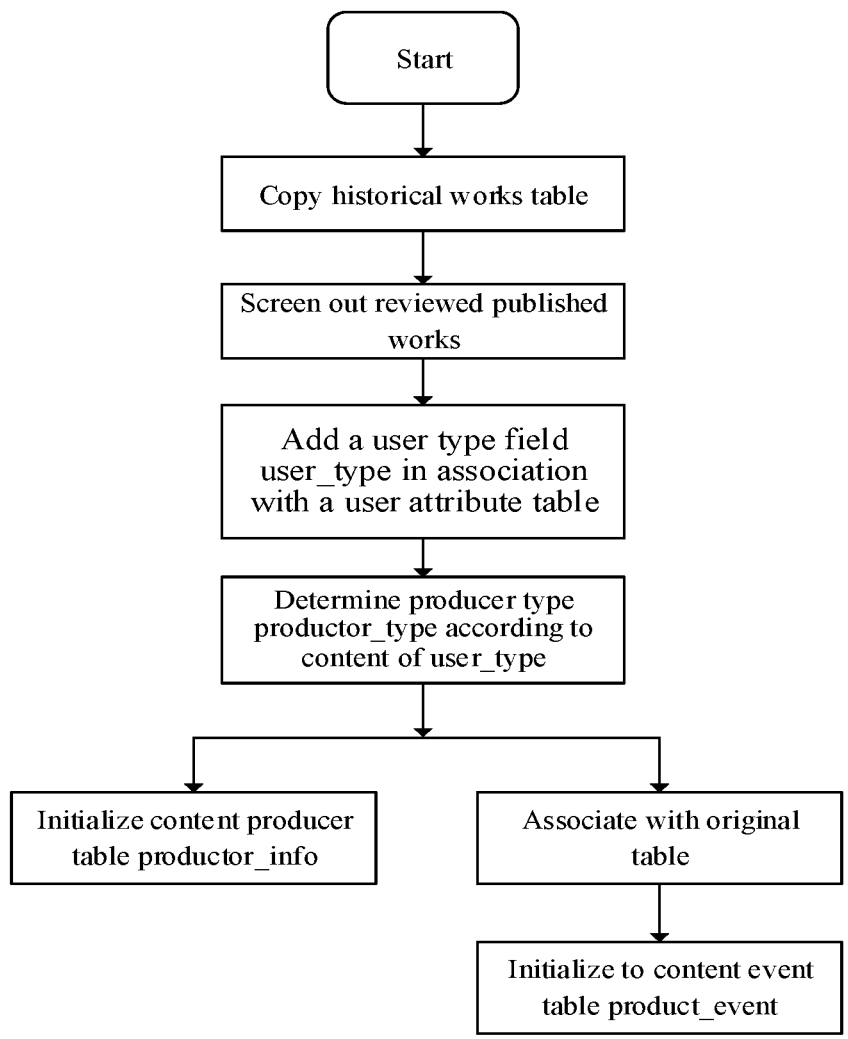
FIG. 2 shows a flowchart illustrating a part of the procedures of a data analysis method in accordance with an embodiment of the present disclosure.

According to the description above, taking data analysis applied to a user uploading a published work using a Clickhouse database management system as an example, the process of obtaining a user information table and an event recording table according to the historical event information may be as shown in FIG. 2 and include:

copying a collection of historical works, namely, a historical event information is copied;

screening out published works that pass the review, that is to say, published works with the target state of "Reviewed, in the Normal state" are picked, and first target users corresponding to a reviewed published work are determined;

adding a user type field user_type in association with a user attribute table, namely, a user type field of the first target user is determined according to the attribute table and written into the user information table;

determining a producer type producer_type according to the content of the user_type, that is to say, the event product type is determined;

inserting the obtained user identifier of the first target user, the user type field user_type and the producer type producer_type into a corresponding producer_info table in the Clickhouse, to obtain an initialized content producer producer_info table, that is to say, an initialized user information table is obtained;

after the producer type producer_type is determined according to the content of the user_type, while obtaining the initialized content producer producer_info table, associating the producer_type with the original historical event information;

associating, according to the user identifier, the historical event information with the above-mentioned user type field user_type and the producer type producer_type, to obtain a full historical works table, which is inserted into a corresponding product_event table in the Clickhouse, and then the initialization of a content event table (namely, the event recording table) is completed.

In the embodiment of the present disclosure, referring to FIG. 1, at step S130, the determining a second target user corresponding to the target event of which the state information is the target state in the collected data, and not recorded in the user information table includes:

selecting, from the collected data, a target event of which the state information is the target state; and associating a user corresponding to the target event of which the state information is the target state with the user information table, and determining the user corresponding to the target event of which the state information is the target state as the second target user in case that there is no associated user in the user information table.

It should be noted that the collected data of the target event is event tracking data of the target event, for example, the event tracking data when a published work is uploaded.

Through the above-mentioned process, users who become content producers for the first time are maintained, event tracking data is read, and published work data of "Reviewed, in the Normal state" is screened out from the user information table.

Optionally, the step of when the user information table has a user identifier field and a user type field, associating a user corresponding to the target event of which state information is the target state with the user information table includes:

associating a user identifier field and a user type field of the user corresponding to the target event of which state information is the target state with the user information table, and in case that there is no user associated with the user identifier field and the user type field in the user information table, determining the user corresponding to the target event of which state information is the target state as a second target user.

For example, taking a user type field including user_type as an example, the two fields, i.e., the user identifier field and user_type are associated with producer_info (i.e., the corresponding user information table), to look for users not in association, which are users becoming PGCP or UGCP for the first time (second target users), and these users are inserted into the producer_info table.

Further, at step S140, when the second target users are added to the user information table and the target events of the second target users are written into the event recording table according to the collected data, the collected data is read and associated with the user information table, and the uploaded works in the collected data corresponding to the second target users are inserted into the event recording table.

Optionally, the method further includes:

when the target event of the second target user is written into the event recording table, adding a first-time record field, the first-time record field being recorded in the event recording table in association with the second target user.

For example, when the uploaded works in the collected data corresponding to the second target users are inserted into the event recording table, the first-time record, i.e., firsttime field, is added, such that it can subsequently be determined, according to the firsttime field, that the state information of the target event becomes the target state for the first time, so as to facilitate conditional screening.

Optionally, the method further includes:
obtaining a query information for performing a target-condition-based query in the event recording table; and
looking for, according to the query information, a third target user in the event recording table, wherein the latest recorded state information of the third target user satisfies the target condition.

For example, when calculating relevant indexes of PGCP and UGCP, the state of the latest event of the user within a preset time range is used as the basis for calculation in conjunction with other screening conditions. For example, when calculating newly added PGCP/UGCP, users whose latest event is in the state and whose firsttime (the time when a user becomes the producer for the first time) is within the time range are searched.

Figure 3:
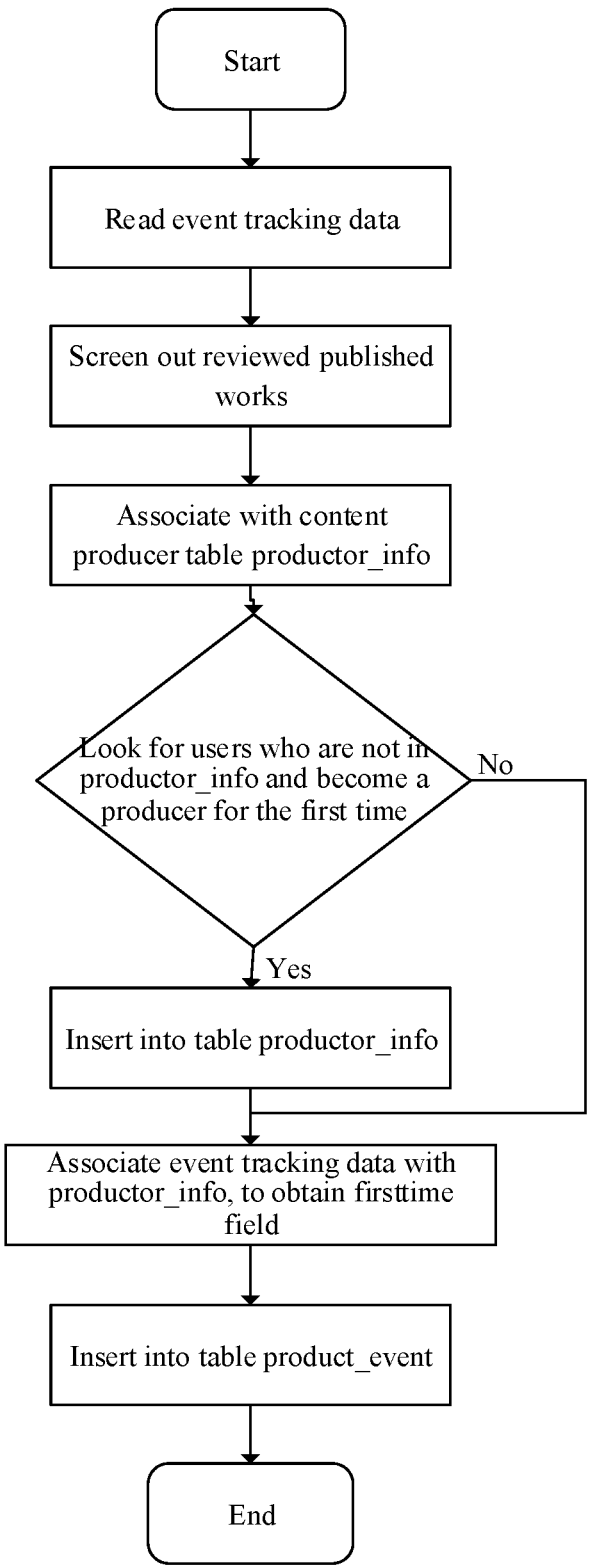
FIG. 3 shows a flowchart illustrating the other part of the procedures of a data analysis method in accordance with an embodiment of the present disclosure.

Therefore, according to the description above, in conjunction with FIG. 3, the adding the second target user to the user information table according to the read collected data of the target event and writing the target event of the second target user into the event recording table according to the collected data specifically include:
reading event tracking data of the target event, namely, the collected data;
screening out reviewed published works, i.e., published works of which the corresponding state information is the target state of reviewed in the collected data;
associating the screened published works with a user information table; for example, in the embodiment of the present disclosure, the user information table is the productor_info table, in other words, the screened published works are associated with the productor_info table;
identifying users corresponding to the screened published works and not in the user information table, namely, a user who becomes the producer for the first time is identified based on the productor_info table;
if a user not in the user information table can be identified, regarding the identified user as a second target user, and inserting the identified second target user into the user information table, namely, into the productor_info table;
after the identified second target user is inserted into the user information table, associating the collected data with the user information table to obtain a corresponding target event, namely, a corresponding uploaded work, and adding a firsttime field; and
inserting the determined corresponding target event and the added firsttime field into the event recording table, i.e., into the productor_info table in the embodiment of the present disclosure.

It should be noted that for the above-mentioned data analysis method, by taking the target event being uploading a work and the target state of the state information of the target event being reviewed as an example, the method is described in detail in the embodiment of the present disclosure. By adopting the method, according to the collected data related to the uploaded work that change in real time, the user whose uploaded work passes the review for the first time can be maintained, and the identified user can be added into a user information table; and after the event data of the identified user is associated with the user information table, the event data can be inserted into the event recording table.

With the user information table and the event recording table obtained by the above-mentioned analysis, when performing a data query, the latest data within a preset time range can be used as an attribute of the user for the calculation of various data indexes.

It should be noted that the above-mentioned data analysis method is not limited to application in the scenario of analysis of uploaded works, but can also be applied to other data analysis scenarios, such as the analysis of microblog data. The user information table maintained is also not limited to users whose uploaded works are reviewed, but can be users whose uploaded works fail the review. For the specific principles of the analysis manners of different attribute parameters in different application scenarios, references may be made to the above detailed description, and detail examples will not be given here.

According to the data analysis method described in the embodiments of the present disclosure, in view of the complex nature that the attribute of a content producer may change due to the change of the review state of an uploaded published work on the iGallery App platform, the time when a user becomes a content producer for the first time is selected to be maintained, and the query is based on the state of the latest event, therefore the analysis result is more clear, accurate and reliable.

In addition, using the method described in the embodiments of the present disclosure, the maintained content event table does not contain update and deletion operations, and can retain all events related to the user's work, which conforms to the characteristics of big data, and retains fine-grained data in preparation for further analysis.

Furthermore, considering the query performance of Clickhouse, the association operations are placed before importing data into the Clickhouse, which not only preserves the high query speed performance of the Clickhouse, but also reduces the cost of subsequent queries, and the desired results can be obtained by using simple structured query language (SQL).

Figure 4:
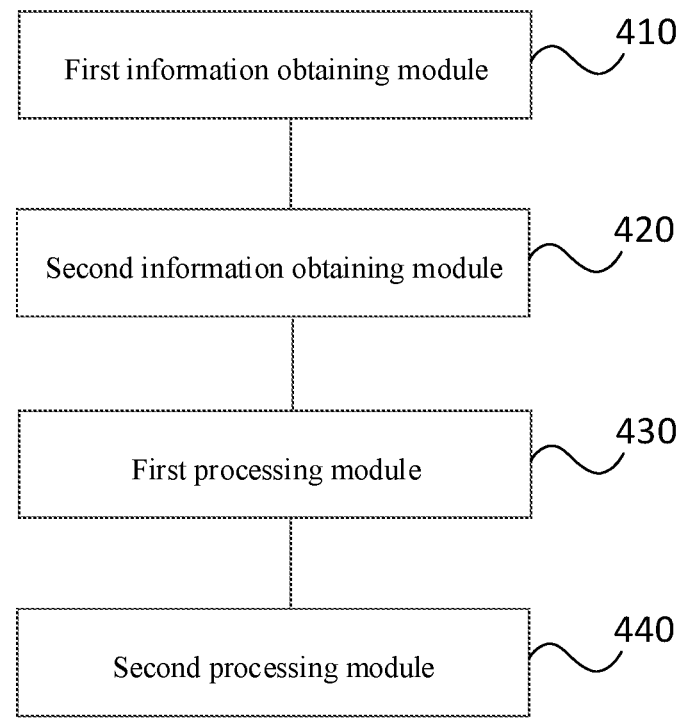
FIG. 4 shows a schematic diagram of a data analysis apparatus in accordance with an embodiment of the present disclosure.

In another aspect of the embodiment of the present disclosure, a data analysis apparatus is provided. As shown in FIG. 4, the apparatus includes:
a first information obtaining module 410 for obtaining historical event information recording a target event; the historical event information including a user related to the target event and state information of the recorded target event;
a second information obtaining module 420 for obtaining a user information table and an event recording table according to the historical event information; wherein the user information table is used for recording a first target user, the state information corresponding to the first target user being a target state, and the event recording table is used for recording a target event of the first target user;
a first processing module 430 for, after reading collected data, which were recorded according to users' performance of the target event, determining a second target user that corresponds to the target event of which the state information is the target state in the collected data, and is not recorded in the user information table; and
a second processing module 440 for adding the second target user to the user information table, and writing the target event of the second target user into the event recording table according to the collected data.

Optionally, in the data analysis apparatus, the second information obtaining module 420 obtaining a user information table according to the historical event information includes:
selecting, from the historical event information, a target event of which the state information is a target state; and
recording a user identifier of a first target user corresponding to the selected target event in a user identifier field, to obtain the user information table recording the first target user.

Optionally, in the data analysis apparatus, the second information obtaining module 420 is further used for:
obtaining an attribute of the first target user according to an attribute table associated with the first target user; and
recording the attribute of the first target user as an attribute field written into the user information table.

Optionally, in the data analysis apparatus, the attribute includes a user type and an event product type;
where the second information obtaining module 420 obtaining an attribute of the first target user according to an attribute table associated with the first target user includes:
obtaining the user type of the first target user according to the attribute table;
determining the event product type according to the user type; and
generating the attribute field according to the event product type.

Optionally, in the data analysis apparatus, the second information obtaining module 420 obtaining an event recording table according to the historical event information includes:
associating a user identifier of the first target user with a target event in the historical event information to obtain the target event corresponding to the first target user; and
recording the target event corresponding to the first target user, to obtain the event recording table.

Optionally, in the data analysis apparatus, the first processing module 430 determining a second target user that corresponds to the target event of which the state information is the target state in the collected data, and is not recorded in the user information table includes:
selecting, from the collected data, a target event of which the state information is the target state; and
associating a user corresponding to the target event of which the state information is the target state with the user information table, and determining the user corresponding to the target event of which the state information is the target state as the second target user in case that there is no associated user in the user information table.

Optionally, in the data analysis apparatus, when the user information table has a user identifier field and a user type field, the first processing module 430 associating a user corresponding to the target event of which state information is the target state with the user information table includes:
associating a user identifier field and a user type field of the user corresponding to the target event of which the state information is the target state with the user information table, and in case that there is no user associated with the user identifier field and the user type field in the user information table, determining the user corresponding to the target event of which the state information is the target state as the second target user.

Optionally, in the data analysis apparatus, the second processing module 440 is further used for:
when the target event of the second target user is written into the event recording table, adding a first-time record field, the first-time record field being recorded in the event recording table in association with the second target user.

Optionally, in the data analysis apparatus, the second processing module 440 is further used for:
obtaining a query information for performing a target-condition-based query in the event recording table; and
looking for, according to the query information, a third target user in the event recording table, the latest recorded state information of the third target user satisfying the target condition.

In an embodiment of the present disclosure, a processing device is provided, including: a processor, a memory, and a program stored in the memory and executable by the processor, wherein the processor is configured to execute the program to implement the aforementioned data analysis method.

In an embodiment of the present disclosure, a readable storage medium storing thereon a program is provided, wherein the program is configured to be executed by a processor to implement the steps of the aforementioned data analysis method.

By adopting the data analysis method, apparatus and device described in the embodiments of the present disclosure, on the basis of Clickhouse, the problem that the identity of a content producer changes as the content state changes is well solved by maintaining a work content producer table and a work content event table, and using a suitable calculation method, and the problem that the clickhouse does not support transactions and cannot do update operations, and is not suitable for doing a large number of joins is overcome; and relevant indexes of content producers can be accurately calculated, so as to provide accurate data analysis results and provide data basis for accurate decision-making of a management layer.

While the foregoing is directed to the optional embodiments of the present disclosure, it will be understood by those skilled in the art that numerous modifications and adaptations may be made without departing from the principles of the disclosure, and such modifications and adaptations are intended to be within the scope of the disclosure.

What is claimed is:

1. A data analysis method, comprising:
obtaining historical event information recording a target event, wherein the historical event information comprising a user related to the target event and state information of the recorded target event;
generating, according to the historical event information, a user information table and an event recording table in a database management system; wherein the user information table is used for recording a first target user, the state information corresponding to the first target user being a target state, and the event recording table is used for recording the target event of the first target user;
after reading collected data, which were recorded according to users' performance of the target event, determining a second target user corresponding to the target event of which the state information is the target state in the collected data, and not recorded in the user information table; and adding the second target user to the user information table in the database management system, and writing the target event of the second target user into the event recording table in the database management system according to the collected data;

wherein the generating, according to the historical event information, the user information table in the database management system comprises:

selecting, from the historical event information, the target event of which the state information is the target state; and recording a user identifier of a first target user corresponding to the selected target event in a user identifier field, to generate the user information table recording the first target user;

wherein the method further comprises:

obtaining an attribute of the first target user according to an attribute table associated with the first target user; and recording the attribute of the first target user as an attribute field written into the user information table;

wherein the attribute comprises a user type and an event product type;

wherein the obtaining the attribute of the first target user according to the attribute table associated with the first target user comprises:

obtaining the user type of the first target user according to the attribute table;

determining the event product type according to the user type; and generating the attribute field according to the event product type.

2. The data analysis method according to claim 1, wherein the generating, according to the historical event information, the event recording table in the database management system comprises:

associating a user identifier of the first target user with the target event in the historical event information, to obtain the target event corresponding to the first target user; and recording the target event corresponding to the first target user, to generate the event recording table.

3. The data analysis method according to claim 1, wherein the determining the second target user corresponding to the target event of which the state information is the target state in the collected data, and not recorded in the user information table comprises:

selecting, from the collected data, the target event of which the state information is the target state; and associating a user corresponding to the target event of which the state information is the target state with the user information table, and determining the user as the second target user in case that there is no associated user in the user information table.

4. The data analysis method according to claim 3, wherein in case that the user information table has a user identifier field and a user type field, the associating the user corresponding to the target event of which state information is the target state with the user information table comprises:

associating the user identifier field and the user type field of the user corresponding to the target event of which state information is the target state with the user information table, and in case that there is no user associated with the user identifier field and the user type field in the user information table, determining the user corresponding to the target event of which state information is the target state as the second target user.

5. The data analysis method according to claim 1, further comprising:

when the target event of the second target user is written into the event recording table, adding a first-time record field, the first-time record field being recorded in the event recording table in association with the second target user.

6. The data analysis method according to claim 1, further comprising:

obtaining a query information for performing a target-condition-based query in the event recording table; and looking for, according to the query information, a third target user in the event recording table, the latest recorded state information of the third target user satisfying the target condition.

7. A non-transitory readable storage medium storing thereon a program, wherein the program is configured to be executed by a processor to implement the steps of the data analysis method according to claim 1.

8. A processing device, comprising: a processor, a memory, and a program stored in the memory and executable by the processor, wherein the processor is configured to execute the program to implement following steps:

obtaining historical event information recording a target event, wherein the historical event information comprising a user related to the target event and state information of the recorded target event;

generating, according to the historical event information, a user information table and an event recording table in a database management system; wherein the user information table is used for recording a first target user, the state information corresponding to the first target user being a target state, and the event recording table is used for recording the target event of the first target user;

after reading collected data, which were recorded according to users' performance of the target event, determining a second target user corresponding to the target event of which the state information is the target state in the collected data, and not recorded in the user information table; and adding the second target user to the user information table in the database management system, and writing the target event of the second target user into the event recording table in the database management system according to the collected data;

wherein the generating, according to the historical event information, the user information table in the database management system comprises:

selecting, from the historical event information, the target event of which the state information is the target state; and recording a user identifier of a first target user corresponding to the selected target event in a user identifier field, to generate the user information table recording the first target user;

wherein the processor is further configured to execute the program to implement following steps:

obtaining an attribute of the first target user according to an attribute table associated with the first target user; and recording the attribute of the first target user as an attribute field written into the user information table;

wherein the attribute comprises a user type and an event product type;

wherein the obtaining the attribute of the first target user according to the attribute table associated with the first target user comprises:
obtaining the user type of the first target user according to the attribute table;
determining the event product type according to the user type; and
generating the attribute field according to the event product type.

9. The processing device according to claim 8, wherein the generating, according to the historical event information, the event recording table in the database management system comprises:
associating a user identifier of the first target user with the target event in the historical event information, to obtain the target event corresponding to the first target user; and
recording the target event corresponding to the first target user, to generate the event recording table.

10. The processing device according to claim 8, wherein the determining the second target user corresponding to the target event of which the state information is the target state in the collected data, and not recorded in the user information table comprises:
selecting, from the collected data, the target event of which the state information is the target state; and
associating a user corresponding to the target event of which the state information is the target state with the user information table, and determining the user as the second target user in case that there is no associated user in the user information table.

11. The processing device according to claim 10, wherein in case that the user information table has a user identifier field and a user type field, the associating the user corresponding to the target event of which state information is the target state with the user information table comprises:
associating the user identifier field and the user type field of the user corresponding to the target event of which state information is the target state with the user information table, and in case that there is no user associated with the user identifier field and the user type field in the user information table, determining the user corresponding to the target event of which state information is the target state as the second target user.

12. The processing device according to claim 8, wherein the processor is further configured to execute the program to implement following step:
when the target event of the second target user is written into the event recording table, adding a first-time record field, the first-time record field being recorded in the event recording table in association with the second target user.

13. The processing device according to claim 8, wherein the processor is further configured to execute the program to implement following steps:
obtaining a query information for performing a target-condition-based query in the event recording table; and
looking for, according to the query information, a third target user in the event recording table, the latest recorded state information of the third target user satisfying the target condition.

* * * * *